United States Patent [19]
Kirk et al.

[11] Patent Number: 6,154,589
[45] Date of Patent: Nov. 28, 2000

[54] METHOD AND SYSTEM FOR REMOVAL OF LOW ORDER OPTICAL TRANSMISSION MODES IN MULTIMODE OPTICAL FIBER COMPUTER NETWORK TO IMPROVE MODAL BANDWIDTH

[75] Inventors: Richard L. Kirk, Spencer; Jerry D. Hutchison, Littleton; Bruce A. Schofield, Tyngsboro, all of Mass.

[73] Assignee: Cabletron Systems, Inc., Rochester, N.H.

[21] Appl. No.: 09/082,767

[22] Filed: May 21, 1998

[51] Int. Cl.$^7$ .................................................. G02B 6/26
[52] U.S. Cl. ................. 385/29; 385/27; 385/28; 385/38; 385/39; 385/123; 385/88
[58] Field of Search .................. 385/15, 27, 28, 385/29, 31, 38, 39, 123, 88

[56] References Cited

U.S. PATENT DOCUMENTS

| | | | |
|---|---|---|---|
| 3,777,150 | 12/1973 | Miller | 385/29 |
| 3,780,295 | 12/1973 | Kapron et al. | 385/28 |
| 4,050,782 | 9/1977 | Uchida et al. | 385/28 |
| 4,281,893 | 8/1981 | Yamada et al. | 385/29 |
| 4,723,828 | 2/1988 | Garel-Jones et al. | 385/28 X |
| 4,942,623 | 7/1990 | Asawa et al. | 385/28 |
| 5,003,623 | 3/1991 | Asawa | 385/28 X |
| 5,416,862 | 5/1995 | Haas et al. | 385/28 |
| 5,559,053 | 9/1996 | Choquette et al. | 437/129 |
| 5,659,568 | 8/1997 | Wang et al. | 372/96 |
| 5,732,170 | 3/1998 | Okude et al. | 385/27 |

FOREIGN PATENT DOCUMENTS

WO 97/33390  12/1997  WIPO .................. 385/123 X

OTHER PUBLICATIONS

Hahn, K.H., et al., "Large Area Multitransverse–Mode VCSELS for Modal Noise Reduction in Multimode Fibre Systems" Electronic Letters, vol. 29, No. 16 (1993) pp. 1482/1483 XP000654608.

Stryckman, D., et al., "Improvement of the Lateral–Mode Discrimination of Broad–Area Diode Lasers with a Profiled Reflectivity Output Facet" Applied Optics, vol. 35, No. 30 (1996) pp. 5955–5959 XP000630964.

DeBaun, B.A., et al., "Direct VCSEL Launch into Large Core Multimode Fiber: Enhancement of the Bandwidth Distance Product", Proceedings of the SPIE, The International Society of Optical Engineering, Proceedings of the Conference, Vertical Cavity Surface Emitting Lasers, San Jose, CA USA 13–14 (1997) vol. 3003, pp. 142–145, XP002116048.

Marcuse, D., "Calculation of bandwidth from index profiles of optical fibers, 1. Theory," *Applied Optics.*, vol. 18, No. 12, 2073–2080 (1979).

Presby, H.M., Marcuse, D., Cohen, L.G., "Calculation of bandwidth from index profiles of optical fibers," *Applied Optics.*, vol. 18, No. 19, 3249–3255 (1979).

*Primary Examiner*—Brian Healy
*Attorney, Agent, or Firm*—Wolf, Greenfield & Sacks, P.C.

[57] ABSTRACT

A method for improving modal bandwidth in computer networks using multimode optical fiber and single mode sources is disclosed in which the optical signal from a center of the optical fiber is blocked from reaching detector. This is accomplished according to a number of different techniques including the use of opaque spots on the fiber media/fiber couplers or the use of dark-cored fiber couplers. These configurations prevent pulse splitting that occurs in single mode source/multimode fiber systems by preventing light from the multimode fiber's center from interfering with the detector. When this is achieved, the detector is insulated from the effects of any pulse splitting, supporting data rates of greater than one GBPS by increasing the modal bandwidth.

37 Claims, 4 Drawing Sheets

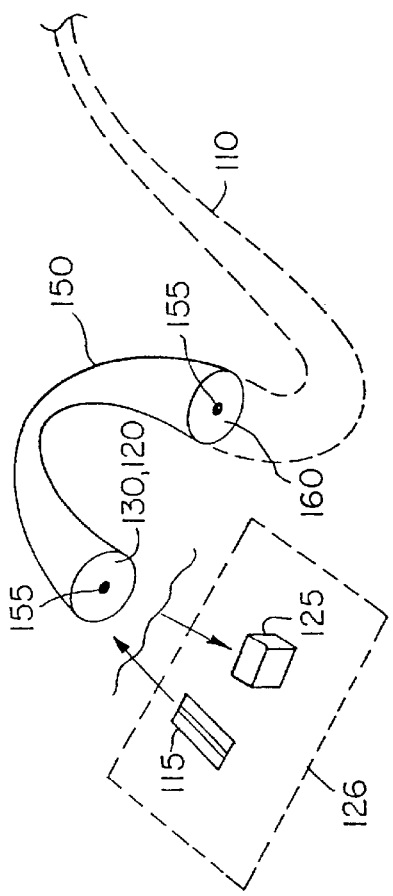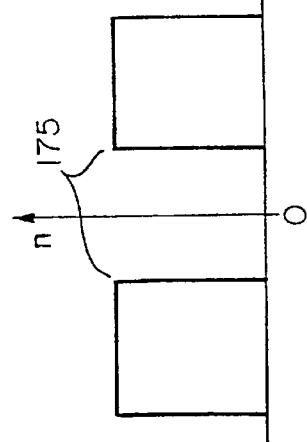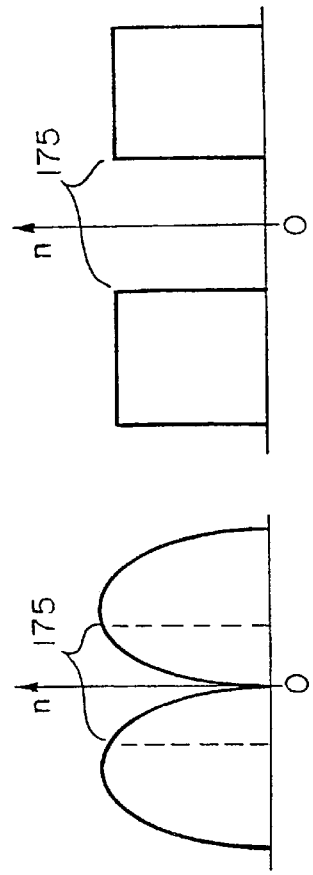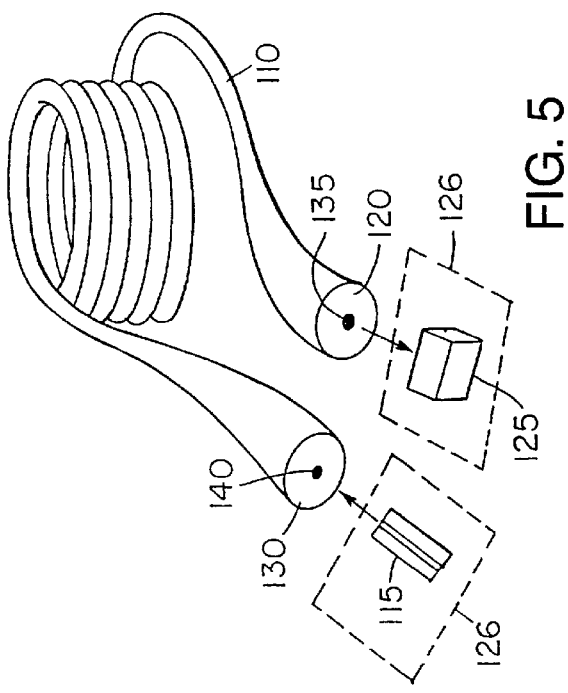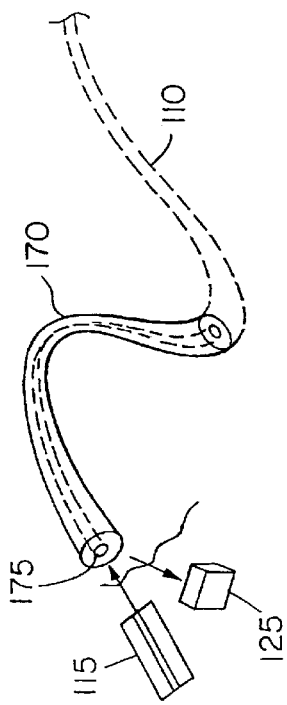

METHOD AND SYSTEM FOR REMOVAL OF LOW ORDER OPTICAL TRANSMISSION MODES IN MULTIMODE OPTICAL FIBER COMPUTER NETWORK TO IMPROVE MODAL BANDWIDTH

BACKGROUND OF THE INVENTION

Historically, local area computer networks (LANs) using optical data links have relied on light emitting diode (LED) sources launching into multimode optical fibers. The EIA/TIA and IEC Building Wiring Standards (TIA 568A) specified the use of 62.5/125 micron multimode optical fiber for intra-building wiring. These standards have resulted in the large-scale deployment of multimode optical fiber in existing computer networks.

In prior communication application technologies, these data transmission platforms have provided adequate bandwidth. Asynchronous transfer mode (ATM) computer networks can support data transmission rates as high as 622 megabits/sec (MBPS), but LED rise times, the chromatic dispersion associated with the relatively wide bandwidth of light produced by the LEDs, and multiple fiber transmission modes impose an upper cap on the potential data rates. Thus, LED/multimode fiber systems are generally limited to sub-gigabit/second (GBPS) data rates.

Newer computer applications requiring higher bandwidths and the increasing number of users that must be serviced by individual networks have led the push to provide GBPS performance, and better. In order to attain this performance in the context of existing optical data links, the LED light sources have been replaced with single mode sources such as vertical cavity surface emitting lasers (VCSEL) and Fabry-Perot lasers. These devices can produce the necessary rise times and have the narrow spectral widths required for GBPS data transmission speeds.

Computer network links modified to use single mode laser sources, however, many times still fail to achieve the data/error rates at GBPS data rates that would be predicted solely from the laser source performance. The problem has been traced to computer links using multimode optical fiber. In many instances, a pulse-splitting phenomena is detected, which increases the bit error rates to unacceptably high levels at these speeds.

The obvious solution to this problem is to use single mode fiber with the single mode sources. While being viable for newly installed computer networks, such a solution is impractical for the installed base of multimode fiber networks since running new fibers in and between buildings represents a significant expense.

Other solutions have been proposed to constrain pulse splitting in signals from single mode sources that have been launched into multimode fibers. In one case, the signal from the single mode source is launched into a short-length pigtail of single mode fiber. The other end of this fiber is then coupled to the existing multimode fiber, offset from the multimode fiber core center.

SUMMARY OF THE INVENTION

The problem with the offset single mode-multimode fiber coupling solution is the difficulty to implement in the typical computer network environment. The single mode fiber must be precisely misaligned to the multimode fiber such that the light is still launched into the multimode fiber with acceptable efficiency, and this misalignment must be maintained in the coupling module across its lifetime.

According to the present invention, pulse splitting is constrained in single mode source/multimode fiber systems by preventing light from the center of the multimode fiber from being transmitted to the detector. When this is achieved, the detector is insulated from the effects of any pulse splitting, supporting data rates of greater than one GBPS by increasing the modal bandwidth.

In general, according to one aspect, the invention features a method for improving modal bandwidth in an optical link, such as in a computer optical network, using a multimode optical fiber. The method comprises generating an optical signal with a single mode laser source and coupling the optical signal into the multimode optical fiber. The optical signal from a center portion of the optical fiber, however, is blocked from reaching a detector of the optical signal.

In implementations, the source is a Fabry-Perot or vertical cavity surface emitting laser.

In specific embodiments, an opaque spot is inserted between the laser source and the detector to block the center of the optical fiber from transmitting a detectable optical signal. As such, the spot is applied to a fiber coupler or the fiber of the network. Further, the spot may be applied to either the entrance or exit apertures of the fiber. In any case, the spot should be between approximately 4 to 7 microns in diameter.

Alternatively, a fiber coupler with a dark central core is also useful. It can be inserted either at the detector or laser source end of the optical fiber, or both.

According to another aspect, the invention features multimode optical fiber of the computer network with at least one opaque spot for blocking the optical signal from a center portion of the optical fiber from reaching the detector.

Finally, according to another aspect, the invention also features a fiber coupler with a dark core for blocking the optical signal from a center portion of an installed multimode optical fiber from reaching a detector.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, like reference characters refer to the same parts throughout the different views. The drawings are not necessarily to scale, emphasis instead being placed upon illustrating the principles of the invention.

FIG. 5 is a schematic drawing showing embodiments of the inventive system for increasing modal bandwidth by preventing center mode light from reaching the detector;

FIG. 6 is a schematic drawing showing other embodiments of the invention using a fiber coupler;

FIG. 7 is a schematic drawing showing still other embodiments of the invention using a dark core fiber coupler; and FIGS. 8A and 8B are two refractive index profiles for the dark core fiber.

DETAILED DESCRIPTION OF THE INVENTION

The modal bandwidth of graded index multimode optical fiber depends directly on the fiber's refractive index profile. The profile is designed to compensate for the different paths traveled by the numerous optical modes supported by the multimode optical fiber. The goal is to equalize delays of all propagating modes. The propagation time of an optical mode through a fiber is proportional to the optical path length. Low order modes propagate nearly straight through the fiber, traveling a distance close to the fiber's physical length L. Higher order modes travel at higher angles, and the physical distance L traveled is consequently longer. The optical path length of all modes is a product of the distance traveled and the refractive index of the optical medium along their respective paths. Compensation for the different modal physical distances is achieved by lowering the refractive index of the region of the fiber in which the higher order modes travel.

The index of refraction compensation is performed during the manufacture of the fiber. When the index is graded correctly, modes of different orders will propagate at compensated velocities and arrive at the far end of the fiber at nearly the same times. Research has shown that the optimum grading is obtained with a refractive index profile of the form:

$$n(r)=n1*[1-2*\Delta n[1-(r/a)^g]]^{0.5} \text{ for } <a, \text{ and } n(r)=n2 \text{ for } r>=a,$$

where:

n(r) is the refractive index at radial position r, n1 is the refractive index peak value, n2 is the refractive index of the cladding glass, a is the core diameter, $\Delta n$ is the index difference=$(n1^2-n2^2)/(2*n1^2)$, and g is the profile parameter, a g=1 gives a straight line curve from 0 to a, g=$\infty$ gives a flat, or step index profile.

A g value of 1.9 to 2.0 has been found to provide optimal propagation delays for multimode optical fibers.

Differential mode delay (DMD) measurements are a method for testing the effectiveness of the index profiling. A fiber is tested by launching a single mode pulse into the core at the core/cladding boundary. The output of the fiber is detected with a high bandwidth detector. The input point is then traversed across a diameter of the fiber while the relative time difference is read and recorded at the other end. The relative delays are plotted against radial position. Fibers with lower DMD profiles, or differences between the delays experienced at the fiber's center relative to near the core/cladding interface, have higher modal bandwidths than those with high DMD profiles.

Figure 1:
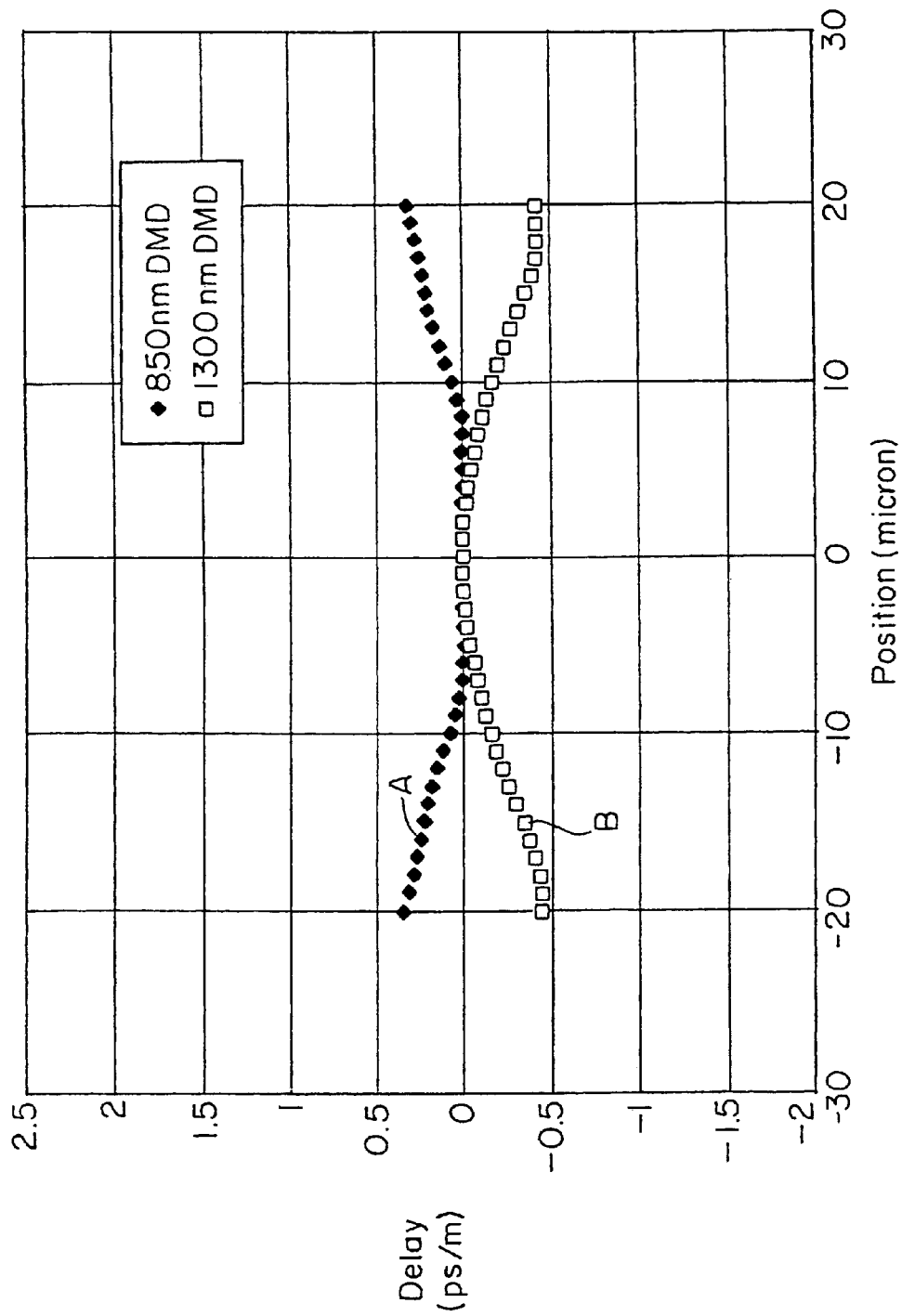
FIGS. 1 and 2 are plots of the differential mode delay in picoseconds per meter as a function of axial launch position for 850 nanometer and 1300 nanometer sources in two exemplary multimode fiber samples.

FIG. 1 is a plot of the DMD for a graded index multimode fiber. Curves A and B show a relatively acceptable DMD for a multimode fiber operating at 850 (see ♦ data points) and 1300 (see ■ data points) nanometers (nm), respectively. In each case, the DMD is less than 0.5 picoseconds per meter (ps/m).

Figure 2:
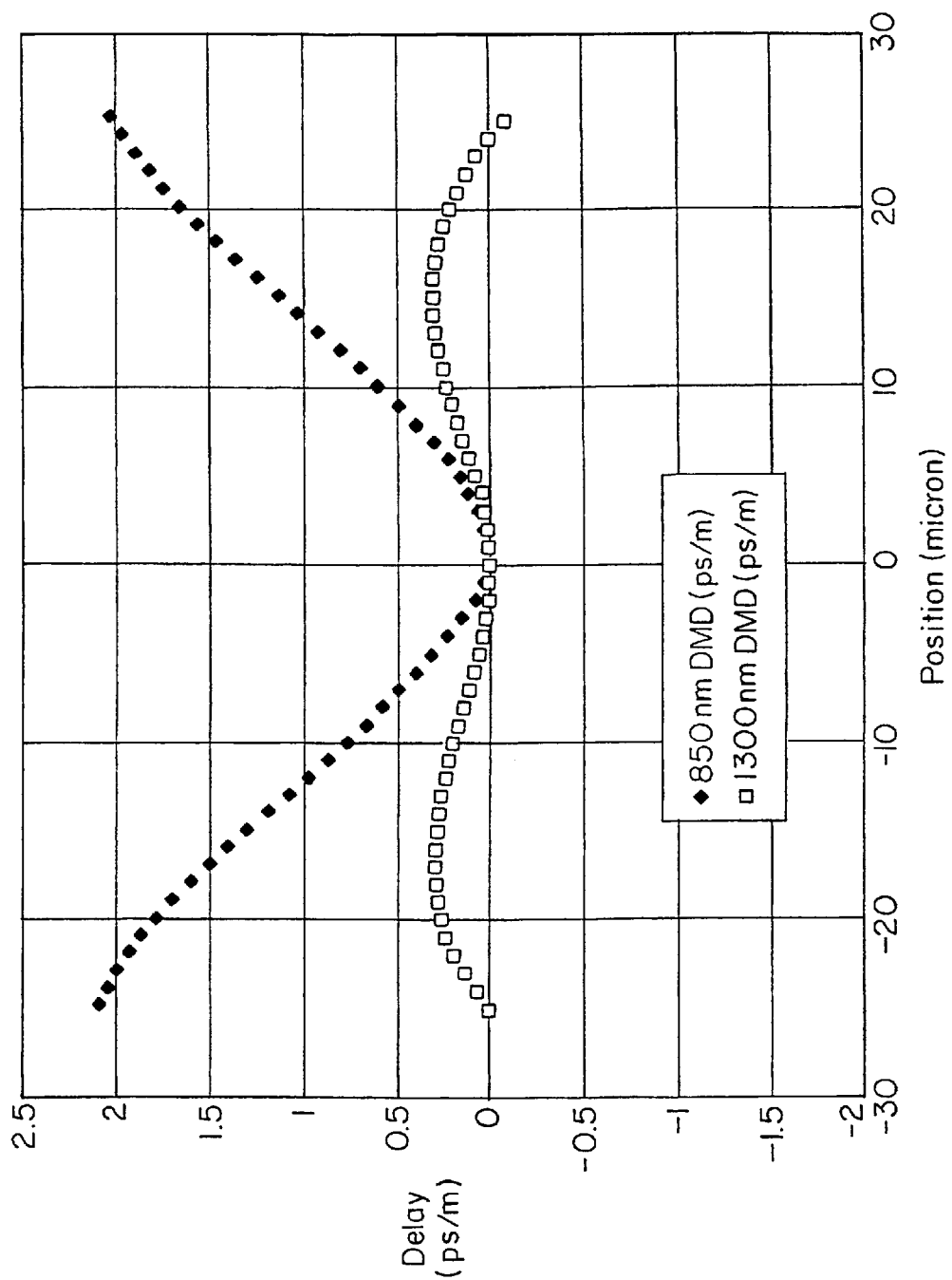

FIG. 2 is a plot of the DMD for another multimode, nominally similar, fiber. The DMD is limited for 1300 nm, but at 850 nm, the DMD reaches 2 ps/m for modes launched at a fiber axial position of ±25 microns from the fiber's center. As a result, when operating at 850 nm, modes transmitted along the fiber's center travel much faster than those near the cladding/core interface.

Figure 3:
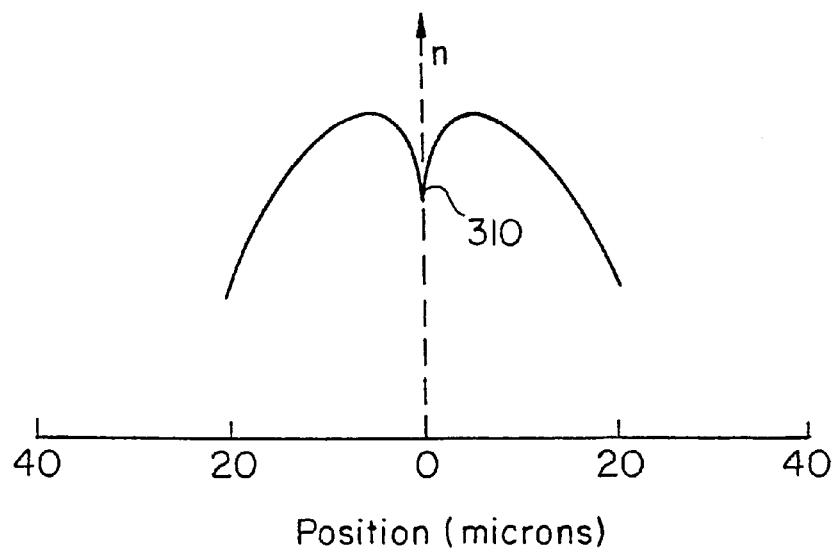
FIG. 3 is a plot of the index of refraction (n) as a function of axial position for an exemplary multimode fiber.

The reduced delay for modes traveling along the fiber's center is theorized to be an artifact of the manufacturing techniques used for the multimode fiber. The fibers are manufactured by slowly depositing closely controlled combinations of chemicals on the inner surface of a hollow glass tube. This process slowly closes the tube off, slowly reducing its inner diameter by the sequential depositions. The last stages, just before the tube is closed-off, can sometimes be incomplete yielding indexes as that illustrated in FIG. 3 when the tube is pulled into the fiber. A sharp anomaly 310 in the graded index (n) occurs near the fiber's center, position 0.

Figure 4:
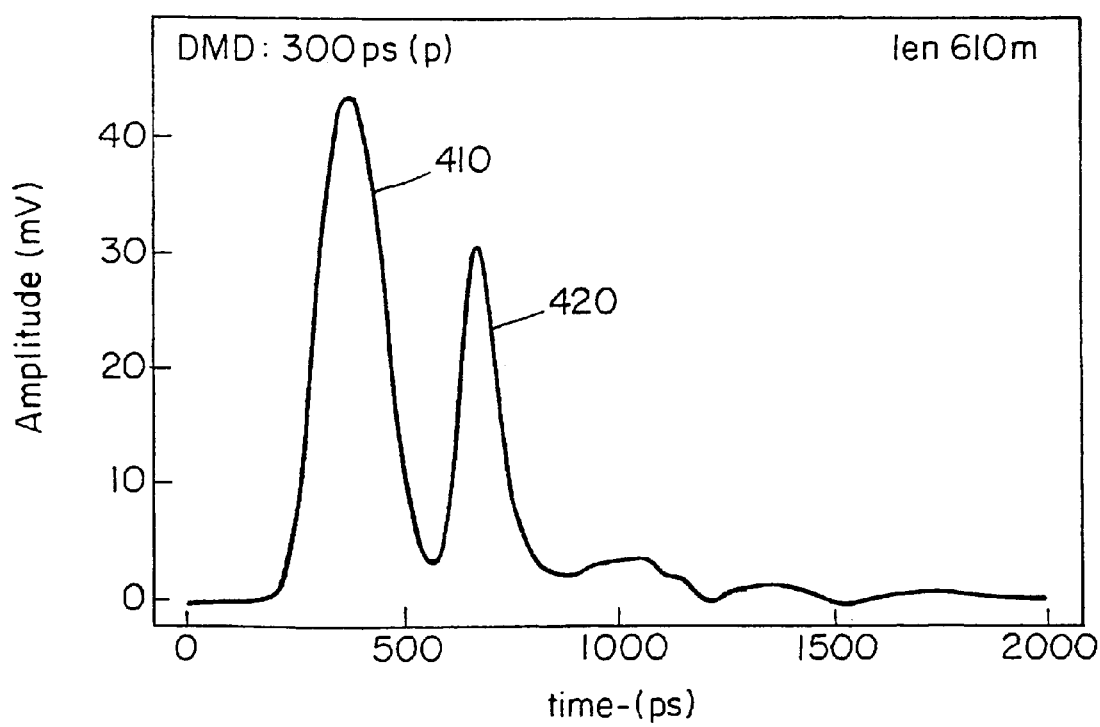
FIG. 4 is a shows a pulse function input signal from a 1300 nm single mode Fabry-Perot laser launched into a 610 meter long, 62.5 micron, fiber run (horizontal scale is 500 ps/division, and the vertical scale is 10 milliVolts/division)

It is theorized that the fiber's center index of refraction anomaly results in pulse splitting such as that shown in FIG. 4 when a single mode laser launches into a multimode fiber. In the experiment, a 1300 nm single mode Fabry-Perot laser launched a pulse function into 610 meter long, 62.5 micron, fiber run. In the plot, the horizontal scale is 500 ps/division, and the vertical scale is 20 milliVolts/division.

After propagating the 610 meters, the original signal is converted into an initial pulse 410 and a secondary pulse 420. This pulse splitting differs from the pulse broadening usually seen when multimode sources are launched into multimode fibers. The highly multimodal and wide bandwidth characteristics of the LED are believed to excite all or most of the fiber's transmission modes. As a result, a relatively small amount of the energy carried by the fiber is transmitted in the fiber's center and thus experiences the problematic transmission delay associated with the center index anomalies. In contrast, it is believed that the single mode laser sources excite a relatively few number of the fiber's modes. Some of those modes propagate along the fiber's center, experiencing little delay, and an almost equivalent optical power is contained in other modes that propagate more toward the cladding/core interface, experiencing delay that would be predicted from the graded fiber configuration. These effects result in the distinct splitting, which severely undermines the decision logic in the detector yielding unacceptably high error rates when the transmission speeds approach 1 GBPS. While not all existing multmode fiber has this problem, a non-trivial amount does, and there is no easy test for identifying the problem fibers.

FIG. 5 illustrates one embodiment of a system for preventing the pulse splitting in multimode fiber 110/single mode source 115 computer data network transmission systems. Briefly, the invention is based on the principle that an opaque spot, applied to the center axis of the multimode fiber, between the detector and source, prevents the fiber modes traveling along the fiber's center axis from reaching the detector. Experiments have shown that stopping the coupling of the fiber's center modes to the detector prevents either pulse splitting effect entirely or the effect at the detector where it causes problems.

In the embodiment of FIG. 5, an opaque spot 135 is applied to exit aperture 120 of the fiber 110, which forms the optical transmission media of the network. This configuration prevents any center modes of the optical signal propagating in the multimode fiber 110 from reaching the detector 125, which is typically part of a network interface card 126 of the computer node or network communications device. As a result, the center modes, which may propagate too quickly due to a reduced center index of refraction present in some multimode fibers, will not contribute to a pulse splitting effect at the detector 125 thereby preserving modal bandwidth.

The opaque spot 135 is preferably large enough to prevent substantially all of the energy in the center modes from reaching the detector 125. In the preferred embodiment, the opaque spot blocks approximately 90% of the energy. This requires a spot between 5 and 7 microns in diameter for 62.5 micron fiber. The opaque spot is preferably circular and applied centered on the fiber's axis as shown.

The opaque spot 135 is applied according to a number of different techniques. In the preferred embodiment, it is painted-on possibly using a jig. Alternatively, it is scribed, etched, or deposited on the fiber end.

As also shown in FIG. 5, an opaque spot 140 is alternatively applied to the input or entrance aperture 130 of the fiber 110. This second configuration prevents the optical signal from the single mode laser source 115, typically also found in a network interface card 126, from exciting any of the center modes of the fiber 110. A characteristic of multimode fibers that allows this embodiment to work is the limited coupling between the fiber's modes. That is, the center modes will not be excited by optical power crossing over from other modes.

According to the invention, the opaque spot is applied to the fiber's input aperture 130 or output aperture 120, individually. Alternatively, opaque spots 140, 135 are applied to both of the input and output apertures 130, 120.

FIG. 6 shows another embodiment in which the opaque spot(s) is/are not necessarily applied to the existing multimode fiber 110 but applied to a fiber pigtail or coupler 150 between the existing multimode fiber 110 and the single mode light source 115 and/or detector 125. As before, the fiber couplers 150 are used at the detector or laser ends, or both. Moreover, the opaque spots 155 on the coupler 150 can be applied to the entrance/exit aperture ends 130, 120 that face the laser 115/detector 125 or to the coupler end 160 that interfaces with the multimode fiber 110, or both.

FIG. 7 shows still another embodiment of the invention. In this case, a coupler 170 is used as in the embodiments in FIG. 6. The fiber coupler's refractive index, however, is constructed so that it has a dark core 175 that can not transmit light, rather than the reliance on the opaque spots.

FIGS. 8A and 8B show two index profiles that will not transmit any light through the fiber's center axis. By doping the fiber during its manufacture such that the index of refraction drops sharply near the fiber's center axis, as shown in FIG. 8A, light will be coupled only into modes existing in an annular ring centered on the fiber. Similarly, FIG. 8B shows a fiber index with an annular step profile. Here, the center 5–7 microns of the fiber transmits no light. As in the previous embodiments, these dark core couplers 170 are placed either at the front end between the transmission fiber 110 and the laser 115 or tail end between the transmission fiber 110 and the detector 125, or both.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of improving modal bandwidth in an optical link using a multimode optical fiber transmission medium, the method comprising:

generating an optical signal with a single mode laser source;

coupling the optical signal into the multimode optical fiber; and blocking the optical signal from a center portion of the optical fiber from reaching a detector of the optical signal.

2. The method as recited in claim 1, wherein generating the optical signal comprises generating the optical signal with a Fabry-Perot laser.

3. The method as recited in claim 1, wherein generating the optical signal comprises generating the optical signal with a vertical cavity surface emitting laser.

4. The method as recited in claim 1, wherein blocking the optical signal comprises placing an opaque spot between the laser source and the detector to block a center axis of the optical fiber from transmitting the optical signal.

5. The method as recited in claim 4, further comprising applying the opaque spot to an exit aperture of the fiber.

6. The method as recited in claim 4, further comprising apply the opaque spot to an entrance aperture of the fiber.

7. The method as recited in claim 4, further comprising applying the opaque spot to a fiber coupler positioned between the laser source and the detector.

8. The method as recited in claim 4, wherein the opaque spot is approximately 4 to 7 microns in diameter.

9. The method as recited in claim 1, wherein blocking the optical signal from the center portion of the optical fiber comprises inserting a fiber coupler that comprises a dark core between the laser source and the detector.

10. The method as recited in claim 9, wherein an index profile of the fiber coupler comprises a portion located at a center axis of the optical fiber wherein not more than 10% of the optical signal is transmitted.

11. The method as recited in claim 9, further comprising inserting the fiber coupler at one of a detector end and a laser source end of the optical fiber.

12. A computer network optical transmission media, comprising:

a multimode optical fiber for transmitting an optical signal between a laser source and a detector; and at least one opaque spot for blocking the optical signal from a center portion of the optical fiber from reaching the detector.

13. The optical transmission media as recited in claim 12, wherein the at least one opaque spot is located between the laser source and the detector along a center of the optical fiber.

14. The optical transmission media as recited in claim 12, wherein the at least one opaque spot is positioned on an exit aperture of the optical fiber.

15. The optical transmission media as recited in claim 12, wherein the opaque spot is positioned on an entrance aperture of the optical fiber.

16. The optical transmission media as recited in claim 12, wherein the opaque spot is approximately 4 to 7 microns in diameter.

17. A computer network optical transmission media, comprising:

a multimode optical fiber for transmitting an optical signal between a laser source and a detector; and at least one fiber coupler for blocking the optical signal from a center portion of the optical fiber from reaching the detector.

18. The optical transmission media as recited in claim 17, wherein the at least one fiber coupler comprises a dark core.

19. The optical transmission media as recited in claim 17, wherein the at least one fiber coupler transmits only an annular ring of light.

20. The optical transmission media as recited in claim 17, wherein a refractive index profile of the at least one fiber coupler comprises a portion located at a center axis of the at least one fiber coupler wherein not more than 10% of the optical signal is transmitted.

21. The optical transmission media as recited in claim 17, wherein the at least one fiber coupler is inserted between the optical fiber and the detector.

22. The optical transmission media as recited in claim 17, wherein the at least one fiber coupler is inserted between the optical fiber and the laser source.

23. The optical transmission media as recited in claim 17, wherein the at least one fiber coupler comprises at least one opaque spot portioned on at least one of an exit aperture and an entrance aperture.

24. The method as recited in claim 9, further comprising inserting the fiber coupler at a detector end of the optical fiber and inserting another fiber coupler at a laser source end of the optical fiber.

25. The method as recited in claim 4, wherein the opaque spot is of a construction sufficient to block at least 90% of the energy in the center modes of the optical signal.

26. The optical transmission media as recited in claim 12, wherein the at least one opaque spot is of a construction sufficient to block at least 90% of the energy in the center modes of the optical signal.

27. The optical transmission media as recited in claim 23, wherein the at least one opaque spot is of a construction sufficient to block at least 90% of the energy in the center modes of the optical signal.

28. A method of improving modal bandwidth in an optical link using a multimode transmission medium, the method comprising:

generating an optical signal;

coupling the optical signal into the transmission medium; and preventing the optical signal from traversing a center portion of the transmission medium.

29. The method as recited in claim 28, wherein the optical signal is generated by a single mode laser source.

30. The method as recited in claim 28, wherein the transmission medium is multimode optical fiber.

31. The method as recited in claim 28, wherein the optical signal is generated by a single mode laser source and wherein the transmission medium is a multimode optical fiber.

32. The method as recited in claim 28, wherein preventing the optical signal from traversing the center portion of the transmission medium comprises:

providing an opaque area on the transmission medium.

33. The method as recited in claim 32, wherein the opaque area is provided on at least one of:

an entrance aperture of the transmission medium; and an exit aperture of the transmission medium.

34. The method as recited in claim 33, wherein the transmission medium is multimode optical fiber and the opaque area is provided by at least one of:

painting;

scribing;

etching; or depositing.

35. An optical transmission apparatus comprising:

transmission means for propagating an optical signal; and blocking means, coupled to the transmission means, for blocking the optical signal from traversing a center portion of the transmission means.

36. The apparatus of claim 35, wherein:

the transmission means comprise multimode optical fiber; and the blocking means comprise an opaque spot positioned on an aperture of the optical fiber.

37. The apparatus of claim 35, wherein:

the transmission means comprise multimode optical fiber.

* * * * *